United States Patent
Sugiura

(10) Patent No.: US 11,254,010 B2
(45) Date of Patent: Feb. 22, 2022

(54) MACHINE TOOL

(71) Applicant: OKUMA Corporation, Aichi (JP)

(72) Inventor: Hiroyuki Sugiura, Aichi (JP)

(73) Assignee: OKUMA CORPORATION, Aichi (JP)

(*) Notice: Subject to any disclaimer, the term of this patent is extended or adjusted under 35 U.S.C. 154(b) by 67 days.

(21) Appl. No.: 16/590,828

(22) Filed: Oct. 2, 2019

(65) Prior Publication Data

US 2020/0108505 A1  Apr. 9, 2020

(30) Foreign Application Priority Data

Oct. 5, 2018 (JP) .............................. JP2018-189699

(51) Int. Cl.
| | |
|---|---|
| *B23Q 17/24* | (2006.01) |
| *B25J 9/16* | (2006.01) |
| *B23Q 11/00* | (2006.01) |
| *B25J 11/00* | (2006.01) |
| *G05B 19/4063* | (2006.01) |
| *B25J 15/00* | (2006.01) |

(52) U.S. Cl.
CPC ............. *B25J 9/1697* (2013.01); *B23Q 11/00* (2013.01); *B23Q 17/2409* (2013.01); *B25J 11/0055* (2013.01); *G05B 19/4063* (2013.01); *B25J 15/0019* (2013.01)

(58) Field of Classification Search
CPC ...... B25J 9/1697; B25J 11/0055; B25J 11/00; B25J 15/0019; B25J 19/023; G05B 19/4063; G05B 2219/40608; G05B 2219/40607; G05B 2219/40609; B23Q 17/2409; B23Q 11/00; B23Q 17/00
See application file for complete search history.

(56) References Cited

U.S. PATENT DOCUMENTS

| | | | | |
|---|---|---|---|---|
| 10,391,559 | B2* | 8/2019 | Morimura | ........... B23Q 17/0971 |
| 10,603,752 | B2* | 3/2020 | Morimura | .............. B25J 9/0096 |
| 2004/0080294 | A1* | 4/2004 | Nihei | ........................ B25J 19/02 |
| | | | | 318/568.16 |
| 2005/0154489 | A1* | 7/2005 | Sone | .................. B23Q 17/2409 |
| | | | | 700/180 |
| 2016/0184945 | A1 | 6/2016 | Saitou | |
| 2016/0184951 | A1 | 6/2016 | Kurokawa | |
| 2017/0259389 | A1 | 9/2017 | Kimura et al. | |
| 2017/0326700 | A1* | 11/2017 | Morimura | ........... B23Q 11/0075 |
| 2017/0326701 | A1 | 11/2017 | Morimura | |

(Continued)

FOREIGN PATENT DOCUMENTS

| | | |
|---|---|---|
| JP | H01127255 A | 5/1989 |
| JP | 10249455 A | 9/1998 |
| JP | 2004142086 A | 5/2004 |

(Continued)

*Primary Examiner* — Eric A. Gates
*Assistant Examiner* — Paul M Janeski
(74) *Attorney, Agent, or Firm* — Cantor Colburn LLP

(57) ABSTRACT

A machine tool is disclosed which continues monitoring even when there is an obstacle such as swarf or a cutting fluid between a machining portion to be monitored and a visual sensor. A visual sensor is attached to an in-machine robot which is movable in a machine tool. A controller operates the visual sensor while judging influences of the swarf and the cutting fluid, automatically judges an orientation experiencing less influence, and executes monitoring from an optimum direction.

14 Claims, 5 Drawing Sheets

(56) References Cited

U.S. PATENT DOCUMENTS

2017/0329316 A1* 11/2017 Morimura ................ B23Q 7/04
2019/0039198 A1* 2/2019 Sugiura ............. B23Q 17/2404

FOREIGN PATENT DOCUMENTS

| JP | 5893719 B1 | 3/2016 |
| JP | 2016124046 A | 7/2016 |
| JP | 2017159407 A | 9/2017 |
| JP | 2017202547 A | 11/2017 |

* cited by examiner

MACHINE TOOL

CROSS REFERENCE TO RELATED APPLICATION

The present invention claims priority under 35 U.S.C. § 119 to Japanese Patent Application No. 2018-189699 filed on Oct. 5, 2018, the entire content of which is incorporated herein by reference.

TECHNICAL FIELD

The present disclosure relates to a machine tool, and in particular to a technique of monitoring a machining portion.

BACKGROUND

In a machine tool, improvement of a machining surface and reduction of defect percentage are desired. For this purpose, monitoring of states of a workpiece, a tool, or the like during machining is desired. However, in the machine tool, there may be cases where locations for attaching sensors are limited, and, when a large number of sensors are provided, an increase in cost may become problematic.

JP 2017-159407 A discloses a machine tool having a cover member which does not have a transparent window through which a machining region can be viewed from the outside.

JP 5893719 B discloses a machine tool having a visual sensor for checking presence or absence of foreign objects. In this machine tool, a pallet is imaged by the visual sensor outside of a machining chamber of the machine tool, to detect the foreign objects.

JP H1-127255 A discloses a monitoring apparatus of a machining portion, comprising a camera attached on a spindle head of an NC machine tool or a part that follows movement of the spindle head, in a manner to allow position adjustment, and a CRT which displays, on one screen in a divided manner, an image captured by the camera and information in the NC machine tool.

In recent years, in the NC machine tools, coverage of an entire surface by a cover is required. Because of this, the state of machining can be viewed only in a limited range created by the window.

In order to solve this problem, attachment of a visual sensor such as a camera in the machine tool may be considered. However, when there are obstacles such as swarf and cutting fluid between a part to be monitored such as the machining portion and the workpiece surface and the visual sensor, the monitoring cannot be performed.

Normally, because the visual sensor is attached to a fixed portion such as the cover, it is not possible to go around the obstacle and see the machining portion. Also, when the visual sensor is attached to a table, a spindle, a tool post, or the like, the sensor cannot be freely moved during the machining, and thus, it is not possible to go around the obstacle and see the machining portion.

An advantage of the present disclosure lies in provision of a machine tool which can avoid an obstacle such as the swarf and the cutting fluid even when the obstacle is caused during the machining of the workpiece, and which can monitor the machining portion.

SUMMARY

According to one aspect of the present disclosure, there is provided a machine tool comprising: a visual sensor that monitors a machining portion of an workpiece during a cutting process; and a controller that judges presence or absence of an influence of a scattered substance ejected during the cutting process, and drives and controls the visual sensor to position the visual sensor at a position where there is no influence of the scattered substance. The controller may be constructed to include one or more processors such as a CPU, and a memory which stores a control program and a control parameter. The one or more processors are configured to drive the visual sensor, by executing a control program stored in the memory.

According to another aspect of the present disclosure, in the machine tool, the controller judges the influence of the scattered substance using an image acquired by the visual sensor.

According to another aspect of the present disclosure, in the machine tool, the controller judges the influence of the scattered substance using a change of an electrical resistance of a plurality of electrodes provided on the visual sensor.

According to another aspect of the present disclosure, in the machine tool, the controller judges the influence of the scattered substance using a force sensor provided on the visual sensor.

According to another aspect of the present disclosure, in the machine tool, the controller sets a search range in which the machining portion can be monitored, according to a positional relationship between the workpiece and a cutting tool, and drives and controls the visual sensor to another position in the search range when there is an influence of the scattered substance.

According to another aspect of the present disclosure, in the machine tool, the controller drives and controls the visual sensor to detect a predetermined characteristic point indicating the machining portion.

According to another aspect of the present disclosure, in the machine tool, the visual sensor is provided on an in-machine robot which is movable in the machine tool, and the controller drives and controls the visual sensor by driving and controlling the in-machine robot.

According to various aspects of the present disclosure, a status of the machining portion such as a cutting point can be monitored without the view being blocked by the cutting fluid and the swarf. In addition, according to various aspects of the present disclosure, the machining portion can be monitored at all times according to a change of the status of the machining. Further, the visual sensor does not need to be manually adjusted every time.

BRIEF DESCRIPTION OF DRAWINGS

Embodiment(s) of the present disclosure will be described based on the following figures, wherein.

DESCRIPTION OF EMBODIMENTS

Figure 1:
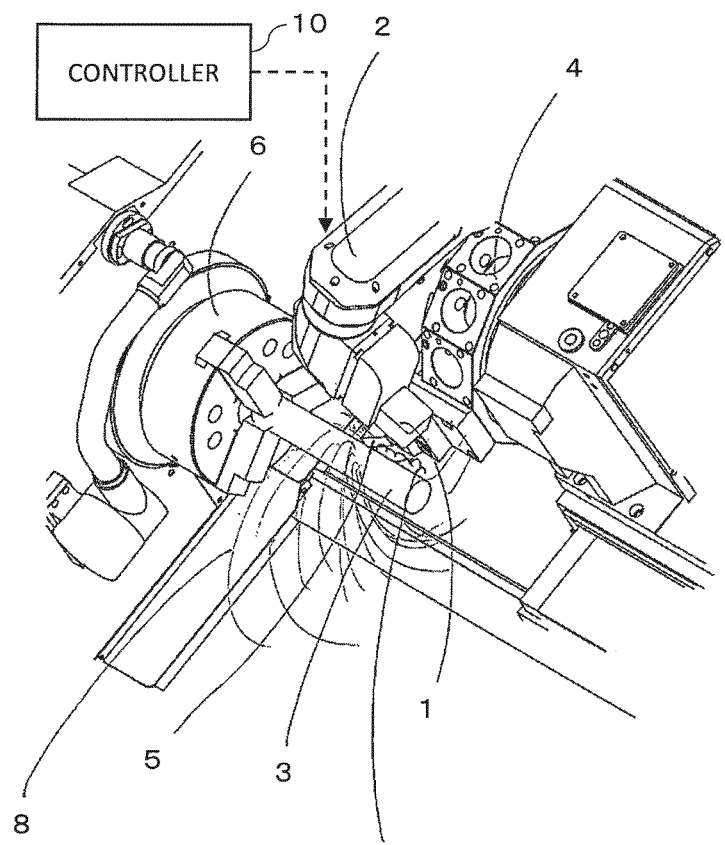
FIG. 1 is a structural diagram of a machine tool according to an embodiment of the present disclosure.

An embodiment of the present disclosure will now be described with reference to the drawings.

A machine tool according to an embodiment of the present disclosure is a multi-tasking machine having a lathe-turn function in which a bite (lathe-turning tool) 5 is brought into contact with a workpiece 3 while the workpiece 3 is rotated, to thereby cut the workpiece 3, and a rotation-cutting function to cut the workpiece 3 with a rotating tool. A periphery of a main body portion of the machine tool is covered by a cover (not shown). A space partitioned by the cover is a machining chamber in which the workpiece 3 is machined. On the cover, at least one opening and a door which opens and closes the opening (neither of which is shown) are provided. An operator accesses the main body portion of the machine tool, the workpiece 3, or the like through the opening. During the machining, the door provided on the opening is closed. This is for the sake of safety and the surrounding environment.

The main body portion comprises a workpiece spindle apparatus which holds the workpiece 3 in a manner to allow self-rotation, a tool spindle apparatus which holds the rotating tool in a manner to allow self-rotation, and a tool post 4 which holds the bite 5. The workpiece spindle apparatus has a head stock placed on a pedestal, and a workpiece spindle attached to the head stock. The workpiece spindle has a chuck 6 or a collet which detachably holds the workpiece 3, and the workpiece 3 to be held can be suitably exchanged. The workpiece spindle self-rotates around a workpiece rotation axis.

The tool spindle apparatus holds a tool for rotation-cutting (rotating tool), for example, a tool called a milling cutter or an end mill, in a manner to allow self-rotation, and has a spindle head in an inside of which a drive motor or the like is built, and a tool spindle attached to the spindle head. The tool spindle has a clamper which detachably holds the rotating tool, and the rotating tool to be held can be exchanged as necessary.

In addition, an in-machine robot 2 is attached to the spindle head via a connection mechanism. The in-machine robot 2 is used for supporting machining, various sensing operations, and various supporting tasks. In the present embodiment, the in-machine robot 2 is in particular used for sensing (monitoring) of the machining portion. The spindle head can swing around a swing axis which passes through the spindle head. With the swinging of the spindle head around the swing axis, an orientation of the in-machine robot 2 is changed.

A controller 10 controls driving of various parts according to a command from an operator. The controller 10 is formed from, for example, a CPU which executes various calculations, and a memory which stores various control programs and control parameters. In addition, the controller 10 has a communication function, and can exchange various data, for example, NC program data or the like, with other devices. The controller 10 may include a numerical controller which continuously calculates positions of the bite 5 and the workpiece 3, and a position of the in-machine robot 2. The controller 10 may be a single device or may be formed by combining a plurality of calculation devices.

The in-machine robot 2 is, for example, an articulated robot having a plurality of arms and a plurality of joints, and an end effector is provided at a tip thereof. As already described, the in-machine robot 2 is attached to the spindle head via the connection mechanism. The connection mechanism is attached to the spindle head via a bearing, and is rotatable with respect to the spindle head. An actuator such as a motor is attached to the connection mechanism, and driving of the actuator is controlled by the controller 10.

An actuator such as a motor is attached at the plurality of joints of the in-machine robot 2, and driving of the actuator is controlled by the controller 10. The controller 10 calculates a position of the end effector from amounts of driving of the actuators provided on the connection mechanism and the joints. The end effector is a member which applies some action with respect to a target, and in the present embodiment is a visual sensor 1 such as a camera.

A detection result of the visual sensor 1; that is, an image captured by the visual sensor 1, is stored in correlation to position information of the visual sensor 1 calculated from the amounts of driving of the connection mechanism and the joints, and is analyzed by the controller 10. A result of the analysis is suitably displayed on a display.

It is sufficient that the visual sensor 1 serving as the end effector is provided on the in-machine robot 2, and a placement position is not limited to the tip of the articulated arm, and may alternatively be an intermediate position on the articulated arm.

The controller 10 positions the visual sensor 1 by driving and controlling the position of the in-machine robot 2, and monitors the machining portion of the workpiece 3 by the bite 5. When swarf 7 or a cutting fluid 8 from a nozzle (not shown) is generated during the machining of the workpiece 3 and exists between the visual sensor 1 and the machining portion, the swarf 7 or the cutting fluid 8 becomes an obstacle, and it becomes impossible to capture the image of the machining portion with the visual sensor 1. For example, depending on the position of the visual sensor 1, the swarf 7 may collide with the visual sensor 1, and may block a field of view of the visual sensor 1. In other cases, depending on the position of the visual sensor 1, the cutting fluid may splash onto the visual sensor 1, and may block the field of view of the visual sensor 1.

Thus, the controller 10 searches for a position where the swarf 7 and the cutting fluid 8 do not adversely affect the visual sensor 1, and drives and controls the in-machine robot 2 to position the visual sensor 1 at the searched position.

Figure 2:
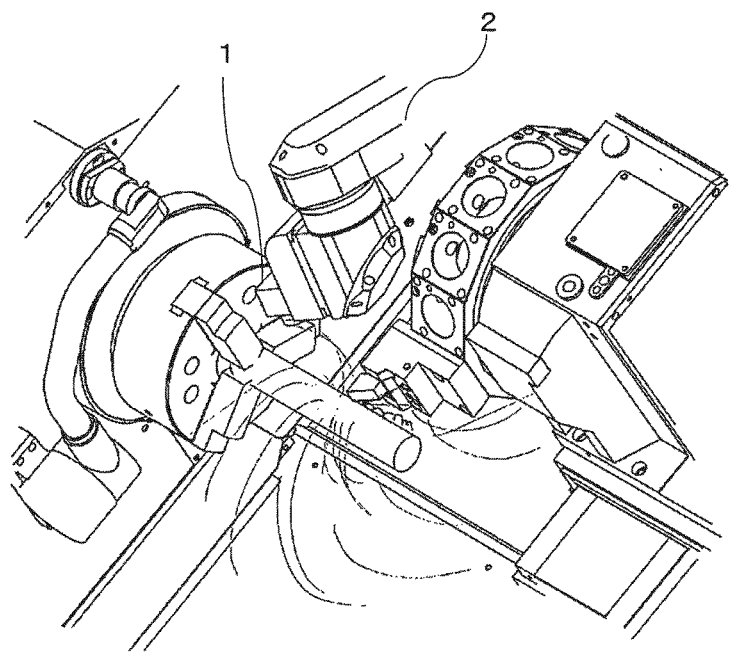
FIG. 2 is a structural diagram of a machine tool according to an embodiment of the present disclosure, at another orientation.

FIG. 2 shows an example where the in-machine robot 2 is driven and controlled from the state of FIG. 1 to change the orientation thereof, and to change the position of the visual sensor 1. The visual sensor 1 is positioned at a position deviated from an existence region of the swarf 7 and the cutting fluid 8, and thus, the image of the machining portion can be acquired without the view being blocked by the swarf 7 or the cutting fluid 8, and the monitoring can be executed.

Figure 3:
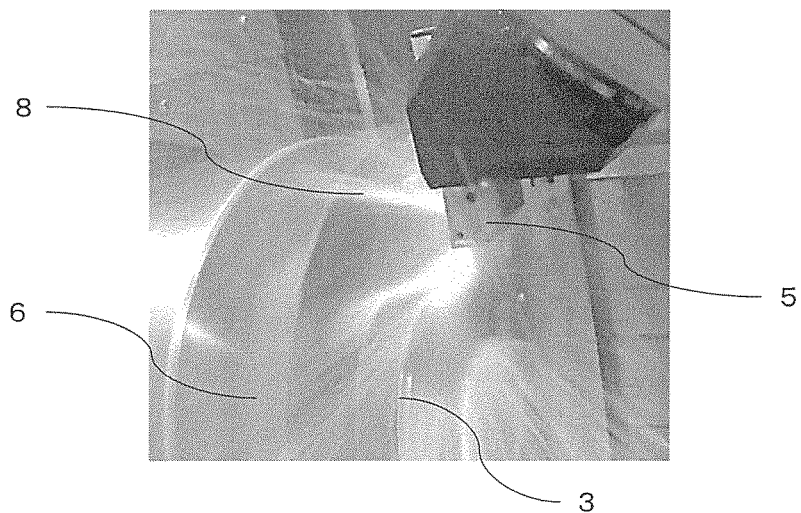
FIG. 3 is an explanatory diagram of an image of a machining portion according to an embodiment of the present disclosure.

FIG. 3 shows an example of an image of the machining portion acquired by capturing by the visual sensor 1. The image is an image in which, while the workpiece 3 gripped by the chuck 6 is rotated, the bite 5 is brought into contact with the workpiece 3, and the workpiece 3 is cut, and shows scattering of the cutting fluid 8 during the cutting. If the visual sensor 1 is positioned outside of the range of scattering of the cutting fluid 8, the cut-machining portion of the workpiece 3 by the bite 5 is displayed, and the machining can be monitored.

Figure 4:
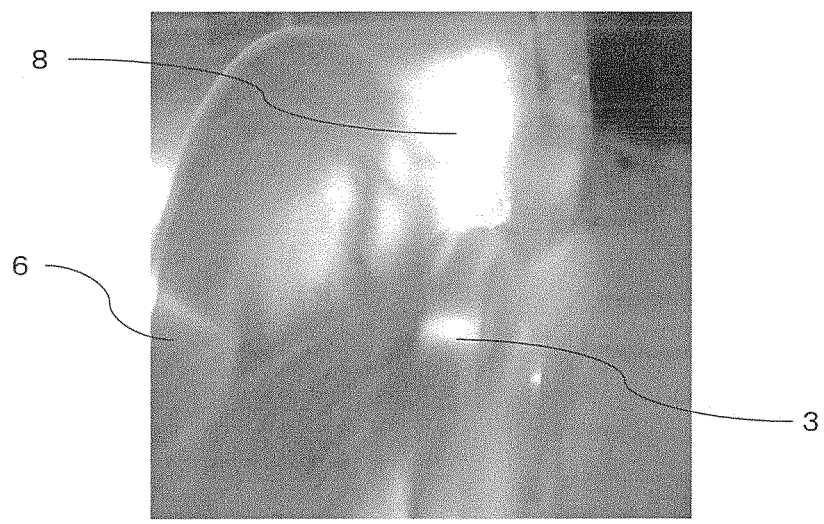
FIG. 4 is an explanatory diagram of an image of a machining portion according to an embodiment of the present disclosure, in a case where a cutting fluid is splashed on a visual sensor.

On the other hand, FIG. 4 shows an example of an image of a case where the visual sensor 1 is positioned within the range of scattering of the cutting fluid 8. Because the cutting fluid 8 is splashed onto the visual sensor 1, the machining portion is blurred due to the influence of the cutting fluid 8, and it becomes difficult to monitor the machining portion. The controller 10 drives and controls the in-machine robot 2 to position the visual sensor 1 at a position where there is no influence of the scattered substances ejected during the cut machining such as the swarf 7 and the cutting fluid 8, in order to avoid the image as shown in FIG. 4 and to maintain the image as shown in FIG. 3.

Figure 5:
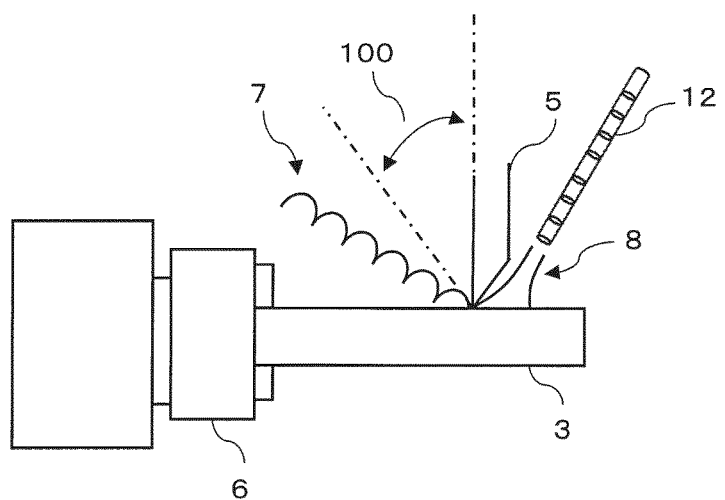
FIG. 5 is an explanatory diagram of an orientation range in which an obstacle can be avoided, according to an embodiment of the present disclosure.

FIG. 5 shows an example of a range in which there is no influence of the scattered substances such as the swarf 7 and the cutting fluid 8. Based on the position of the bite 5 with respect to the workpiece 3, and the position of the nozzle 12 which ejects the cutting fluid 8, a position and a distance in which the machining portion can be observed are determined. In addition, based on a scattering range of the swarf discharged during the cutting and a scattering range of the cutting fluid ejected from the nozzle 12, a range in which there is no influence of the swarf 7 and the cutting fluid 8 is determined. In the figures, a search range 100 of the visual sensor 1 is determined as a position and a distance in which the machining portion can be imaged, and as a range where there is no influence of the swarf 7 and the cutting fluid 8. The visual sensor 1 is positioned at some location in the search range 100.

Specifically, the controller 10 controls the orientation of the in-machine robot 2 such that the visual sensor 1 faces a direction of a cutting point which is the machining portion, and searches for a position where there is no influence of the scattered substances such as the swarf 7 and the cutting fluid 8. For the determination of whether or not there is an influence of the scattered substances such as the swarf 7 and the cutting fluid 8, for example, the following methods may be used.

(1) Analysis of Acquired Image

When the swarf 7 or the cutting fluid 8 is splashed onto the visual sensor 1, the image is blurred as shown in FIG. 4. Therefore, an image acquired by the visual sensor 1 may be analyzed (space-frequency analysis), it may be judged as to whether or not the focus is de-focused, and it may be judged that there is an influence of the swarf 7 or the cutting fluid 8 when the image is out of focus even though the visual sensor is positioned at a distance where the image should be focused.

(2) Electrical Resistance

A plurality of electrodes may be attached at a periphery of the visual sensor 1, and an electrical resistance may be measured, to judge whether or not the cutting fluid 8 is splashed. When the cutting fluid 8 is splashed, the electrical resistance would be significantly reduced. Thus, it may be judged that there is an influence of the cutting fluid 8 by detecting the reduction of the electrical resistance. In addition, when the swarf 7 is a conductor such as a metal, the electrical resistance would similarly be significantly reduced, and the judgment may be made. Air blow may be applied to the electrodes at a predetermined interval, to prevent erroneous detection due to presence of water droplets or the like.

(3) Force Sensor

A force sensor may be attached to the visual sensor 1, and presence or absence of collision of the swarf 7 or the cutting fluid 8 may be judged. As the force sensor, a strain gauge or a pressure-sensitive sensor may be employed. The strain gauge may be attached to a root of the visual sensor 1, and the pressure-sensitive sensor may be attached to a surface of the visual sensor 1.

Each of these methods may be used alone or as part of a combination. In addition, because it is desirable to prevent attachment of the swarf 7 and the cutting fluid 8 onto the visual sensor 1, it is desirable to maintain the field of view by a water-repelling treatment or by air blow, a wiper, or the like.

Further, when the controller 10 positions the visual sensor 1 at a position where the machining portion can be viewed, the judgment of whether or not the machining portion can be viewed can be made by judging whether or not a predetermined characteristic point can be viewed. As the characteristic point, a shape of the bite 5 or the shape of the workpiece 3 may be used. Alternatively, a marker may be attached to a tip of the bite 5, and used as the characteristic point.

Figure 6:
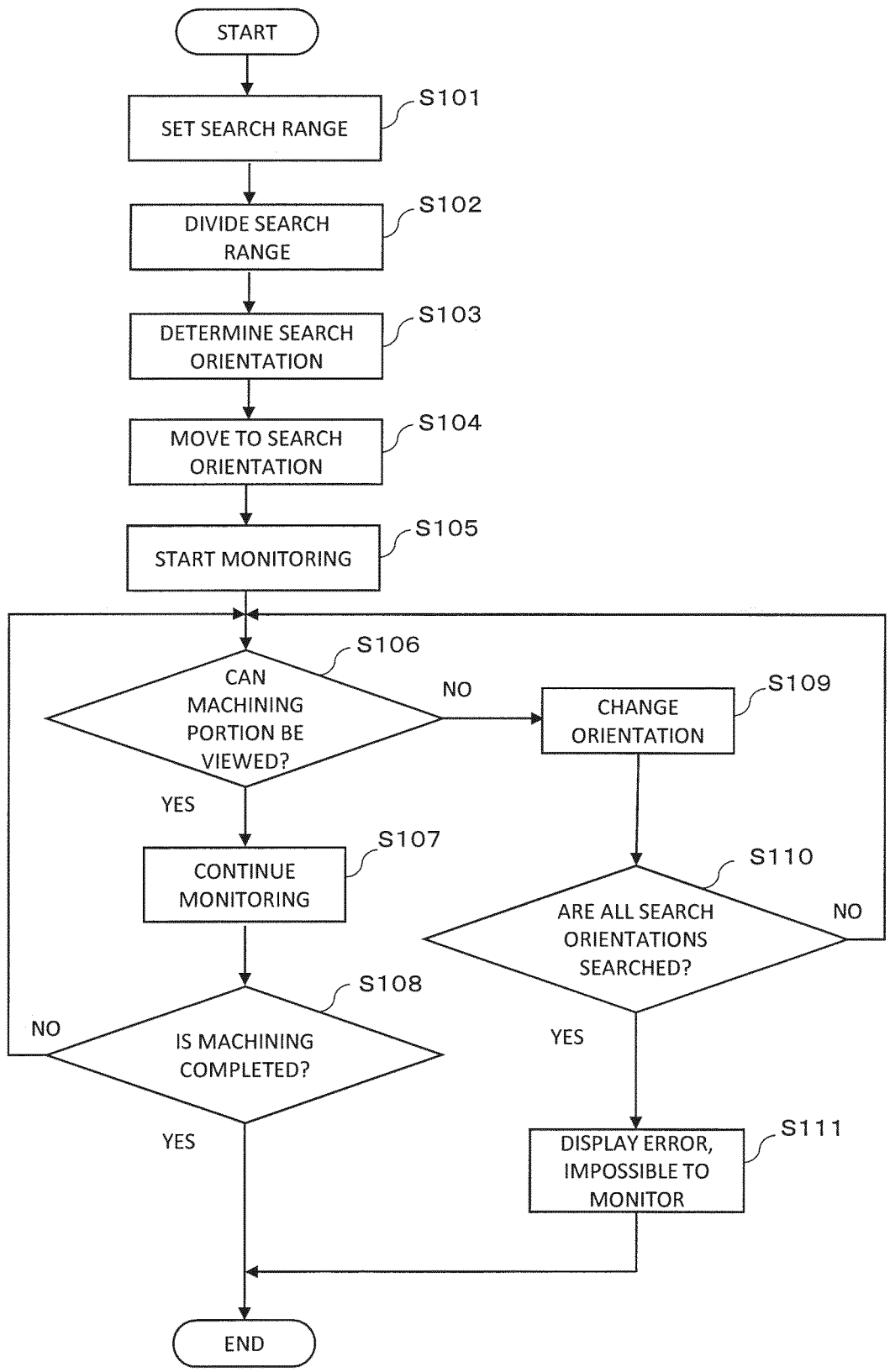
FIG. 6 is a process flowchart of an embodiment of the present disclosure.

FIG. 6 shows a process flowchart of the present embodiment.

First, the controller 10 sets a search range (S101). The search range is set based on the positional relationship among the workpiece 3, the bite 5, and the nozzle 12, and as a range which does not interfere with other pieces of equipment in the machine tool (including fixed equipment and movable equipment). The search range 100 shown in FIG. 5 is an example of such a search range.

The search range is a range which is wide and greater than or equal to a certain range, which is at a distance where a region around the machining portion can be monitored, which does not obstruct machining, and which does not interfere with the other pieces of equipment.

After the search range is set, the search range is divided into predetermined unit regions (S102), and, for each unit region, a search orientation; that is, an orientation of the in-machine robot 2 in which the visual sensor 1 faces the direction of the machining portion, is set (S103).

After the search orientation is set, the in-machine robot 2 and the visual sensor 1 are moved to the search orientation (S104), the machining portion is imaged to acquire an image thereof, and the monitoring is started (S105).

After the monitoring is started, the controller 10 judges whether or not the machining portion can be viewed (S106). Alternatively, in place of this judgement, it is also possible to judge whether or not the image is defocused, whether or not the electric resistance is significantly reduced, or whether or not collision of the scattered substances is detected by the force sensor.

When the machining portion can be viewed (YES in S106), the monitoring is continued (S107), and it is judged whether or not the machining of the workpiece 3 is completed (S108). If the machining is not completed (NO in S108), the processes from S106 are repeated.

On the other hand, when the machining portion cannot be viewed (NO in S106), or when the image is defocused, the electrical resistance is significantly reduced, or the collision of the scattered substances is detected, the orientations of the in-machine robot 2 and the visual sensor 1 are changed (S109). That is, the visual sensor 1 is moved to another unit region, which was divided in S102. The processes from S106 are then repeated (S110). When the machining portion can be viewed after the visual sensor is moved to another unit region (YES in S106), the orientation is maintained and the monitoring is continued (S107). When the machining portion cannot be viewed even after all search orientations are searched (YES in S110), an error is displayed on the display, and it is judged that the monitoring is impossible (S111).

Figure 7A:
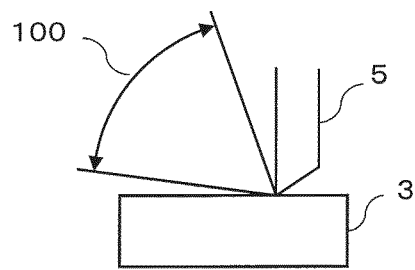
FIG. 7A is a schematic explanatory diagram of a process according to an embodiment of the present disclosure.
Figure 7B:
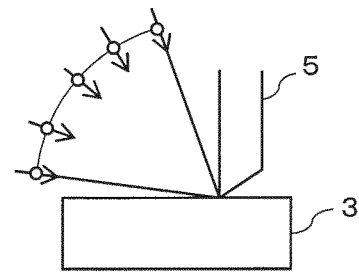
FIG. 7B is a schematic explanatory diagram of a process according to an embodiment of the present disclosure.
Figure 7C:
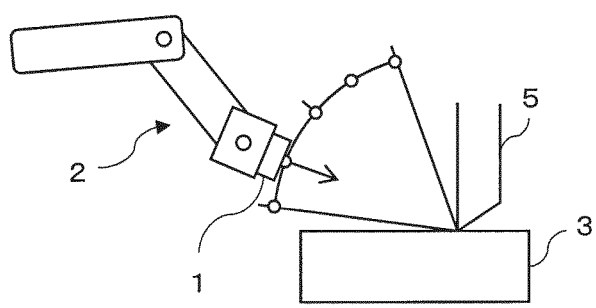
FIG. 7C is a schematic explanatory diagram of a process according to an embodiment of the present disclosure.

FIG. 7A~FIG. 7C schematically show processes of S101~S104 shown in FIG. 6. FIG. 7A shows the search range setting process of S101. Based on the positions of the workpiece 3 and the bite 5, a range where the machining portion or the characteristic point representing the machining portion can be viewed is set as the search range 100. FIG. 7B shows the search range dividing process of S102. When the search range 100 is an arc region, the arc region is divided with equal angles. FIG. 7C shows the search orientation determination process of S103, and the movement process to the search orientation of S104. When the search orientation is determined, the controller 10 drives the in-machine robot 2 to the position of this search orientation, to thereby position the visual sensor 1 at the determined search orientation.

The machining portion is monitored in the orientation of FIG. 7C, and the orientation is maintained and the monitoring is continued so long as the machining portion can be viewed. When it becomes impossible to view the machining portion due to influences of the swarf 7 and the cutting fluid 8, the controller 10 changes the position of the visual sensor 1 to another position in the search range 100, and continues the monitoring of the machining portion.

As described, according to the present embodiment, the machining portion can be monitored without the view being obstructed by the scattered substances such as the swarf 7 and the cutting fluid 8. In addition, in the present embodiment, even if it becomes impossible to monitor the machining portion by the visual sensor 1 by the scattered substances, the controller 10 detects such a circumstance, and automatically changes and adjusts the orientation of the visual sensor 1. Thus, it is not necessary to manually adjust the orientation of the visual sensor 1 every time. In particular, in normal machining, even at a position where there is no influence of the scattered substances such as the swarf 7 and the cutting fluid 8, during abnormality, for example, wear or damaging of the tool, variation of the workpiece 3, or the like, the scattered substances may affect the monitoring. In the present embodiment, in the event of such an abnormality also, the machining portion can be continued to be monitored. This means that the machining circumstances can be reliably recorded in the event of abnormality, which is a case where recording the abnormality in a log is highly important.

The invention claimed is:

1. A machine tool comprising:
a visual sensor that monitors a machining portion of an workpiece during a cutting process; and
a controller that judges presence or absence of an influence of a scattered substance ejected during the cutting process, and drives and controls the visual sensor to position the visual sensor at a position where there is no influence of the scattered substance.

2. The machine tool according to claim 1, wherein
the controller judges the influence of the scattered substance using an image acquired by the visual sensor.

3. The machine tool according to claim 1, wherein
the controller judges the influence of the scattered substance using a change of an electrical resistance of a plurality of electrodes provided on the visual sensor.

4. The machine tool according to claim 1, wherein
the controller judges the influence of the scattered substance using a force sensor provided on the visual sensor.

5. The machine tool according to claim 1, wherein
the controller sets a search range in which the machining portion can be monitored, according to a positional relationship between the workpiece and a cutting tool, and drives and controls the visual sensor to another position in the search range when there is an influence of the scattered substance.

6. The machine tool according to claim 1, wherein
the controller drives and controls the visual sensor to detect a predetermined characteristic point indicating the machining portion.

7. The machine tool according to claim 1, wherein
the visual sensor is provided on an in-machine robot which is movable in the machine tool, and
the controller drives and controls the visual sensor by driving and controlling the in-machine robot.

8. A machine tool comprising:
a visual sensor that monitors a machining portion of an workpiece during a cutting process; and
one or more processors configured to, by executing a program stored in a memory: judge presence or absence of an influence of a scattered substance ejected during the cutting process; and drive the visual sensor to position the visual sensor at a position where there is no influence of the scattered substance.

9. The machine tool according to claim 8, wherein
the one or more processors are configured to, by executing the program: judge the influence of the scattered substance using an image acquired by the visual sensor.

10. The machine tool according to claim 8, wherein
the one or more processors are configured to, by executing the program: judge the influence of the scattered substance using a change of an electrical resistance of a plurality of electrodes provided on the visual sensor.

11. The machine tool according to claim 8, wherein
the one or more processors are configured to, by executing the program: judge the influence of the scattered object using a force sensor provided on the visual sensor.

12. The machine tool according to claim 8, wherein
the one or more processors are configured to, by executing the program: set a search range in which the machining portion can be monitored, according to a positional relationship between the workpiece and a cutting tool, and drive the visual sensor to another position in the search range when there is an influence of the scattered substance.

13. The machine tool according to claim 8, wherein
the one or more processors are configured to, by executing the program: drive the visual sensor to detect a predetermined characteristic point indicating the machining portion.

14. The machine tool according to claim 8, wherein
the visual sensor is provided on an in-machine robot which is movable in the machine tool, and
the one or more processors are configured to, by executing the program: drive the visual sensor by driving the in-machine robot.

* * * * *